(12) United States Patent
Su et al.

(10) Patent No.: US 10,705,555 B2
(45) Date of Patent: Jul. 7, 2020

(54) ROLLER MODULE

(71) Applicant: Primax Electronics Ltd., Taipei (TW)

(72) Inventors: Chun-Nan Su, Taipei (TW); Chun-Che Wu, Taipei (TW); Chia-Yuan Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 70 days.

(21) Appl. No.: 16/232,924

(22) Filed: Dec. 26, 2018

(65) Prior Publication Data

US 2020/0133326 A1    Apr. 30, 2020

(30) Foreign Application Priority Data

Oct. 26, 2018 (TW) .............................. 107138032 A

(51) Int. Cl.
*G05G 5/03* (2008.04)
*G05G 1/10* (2006.01)
*G06F 3/0354* (2013.01)

(52) U.S. Cl.
CPC ................. *G05G 5/03* (2013.01); *G05G 1/10* (2013.01); *G06F 3/03543* (2013.01); *G05G 2505/00* (2013.01)

(58) Field of Classification Search
None
See application file for complete search history.

(56) References Cited

U.S. PATENT DOCUMENTS

| | | | | |
|---|---|---|---|---|
| 5,696,537 A * | 12/1997 | Solhjell | ............... | G06F 3/03543 345/164 |
| 6,157,369 A * | 12/2000 | Merminod | ............ | G06F 3/0312 345/157 |
| 6,353,429 B1 * | 3/2002 | Long | ................... | G01D 5/34738 345/158 |
| 8,446,366 B2 * | 5/2013 | Blandin | .............. | G06F 3/03543 345/156 |
| 10,599,237 B1 * | 3/2020 | Liu | ...................... | G06F 3/03549 |
| 2007/0146324 A1 * | 6/2007 | Blandin | ................ | G06F 3/0362 345/163 |
| 2013/0027306 A1 * | 1/2013 | Peng | ...................... | G06F 3/0362 345/163 |
| 2013/0027308 A1 * | 1/2013 | Peng | ................... | G06F 3/03543 345/163 |
| 2017/0262083 A1 * | 9/2017 | Huang | ................. | G06F 3/03543 |
| 2017/0277283 A1 * | 9/2017 | Chao | ..................... | G06F 3/0362 |
| 2018/0267629 A1 * | 9/2018 | Lin | ........................ | G06F 3/0362 |
| 2019/0094991 A1 * | 3/2019 | Tsai | ...................... | G06F 3/0362 |

* cited by examiner

*Primary Examiner* — Sepehr Azari
(74) *Attorney, Agent, or Firm* — Kirton McConkie; Evan R. Witt

(57) ABSTRACT

A roller module for an input module includes a roller base, a roller element and an adjusting element. The roller element is pivotally coupled to the roller base. Moreover, at least one discontinuous protrusion structure is circumferentially arranged a bottom surface of a concave region of the roller element. A contacting part of the adjusting element is contacted with the at least one discontinuous protrusion structure. Consequently, a rotation of the roller element results in a tactile feel.

12 Claims, 8 Drawing Sheets

ROLLER MODULE

FIELD OF THE INVENTION

The present invention relates to a roller module, and more particularly to a roller module for an input device.

BACKGROUND OF THE INVENTION

A mouse is used to control a cursor on a computer screen in order to operate the computer. A roller of the mouse is one kind of button that is frequently used by the user of the computer. For example, by rotating the roller, the function of browsing web pages or moving the cursor can be achieved. Alternatively, by pressing the roller, a middle button signal is generated or the function of switching to a different operation mode is achieved.

For increasing the convenience and comfort of operating the roller, a roller module of an input device is disclosed in Taiwanese Patent No. 1448928. In the roller module, a recess or a hollow slot of the roller is equipped with one or two different toothed surfaces. When a swinging arm is contacted with one of the toothed surfaces, the rotation of the roller generates different tactile feels. Moreover, a hyper-fast roller module of a mouse is disclosed in Taiwanese Patent No. M498914. A tooth part and a stopping rod are installed in the roller module. In case that the stopping rod is pushed by a torsion spring, the stopping rod is in close contact with the tooth part. When a button linked with the stopping rod is operated by the user, the roller is switched between a hyper-fast scrolling mode and an ordinary scrolling mode. However, the conventional technologies still have some drawbacks. For example, since the mechanism for allowing the mouse to generate more tactile feels is usually very complicated, the layout of other components within the mouse is adversely affected and the yield of the mouse is reduced. Moreover, since only one or two tactile feels are provided, the conventional mouse cannot meet the user's requirements.

For meeting the requirements of different users, there is a need of providing a roller module with a simplified structure and capable of generating plural tactile feels.

SUMMARY OF THE INVENTION

The present invention provides a roller module with a simplified structure and capable of generating plural tactile feels.

In accordance with an aspect of the present invention, there is provided a roller module for an input device. The roller module includes a roller base, a roller element and an adjusting element. The roller element includes a concave region and a fixing shaft. The fixing shaft is partially disposed within the concave region and pivotally coupled to the roller base. Moreover, at least one discontinuous protrusion structure is circumferentially arranged a bottom surface of the concave region. The adjusting element includes a contacting part and an operating part. The operating part is connected with the contacting part. The contacting part is contacted with the at least one discontinuous protrusion structure, so that a rotation of the roller element results in a tactile feel.

In an embodiment, the roller base includes an accommodation space, and the roller element is partially accommodated within the accommodation space.

In an embodiment, two positioning recesses are respectively formed in a first lateral wall and a second lateral wall of the roller base and at a top side of the accommodation space, and the fixing shaft is pivotally coupled to the positioning recesses.

In an embodiment, a supporting frame is disposed on the first lateral wall of the roller base, and the supporting frame has a locking recess.

In an embodiment, the contacting part includes a contacting segment, a connecting segment and a stopping block. The contacting segment has a contact terminal. The contact terminal is contacted with the at least one discontinuous protrusion structure. The connecting segment is pivotally coupled to the locking recess and connected with the operating part. The stopping block is connected between the contacting segment and the connecting segment. The stopping block is contacted with a surface of the supporting frame. The contacting segment is permitted to be swung relative to the stopping block.

In an embodiment, the roller base has a slot, and the contacting segment is penetrated through the slot.

In an embodiment, the operating part is a knob with a holding structure.

In an embodiment, the at least one discontinuous protrusion structure includes a first discontinuous protrusion structure, a second discontinuous protrusion structure and a third discontinuous protrusion structure. The first discontinuous protrusion structure is circumferentially arranged around the fixing shaft. The second discontinuous protrusion structure is circumferentially arranged around the first discontinuous protrusion structure. The third discontinuous protrusion structure is circumferentially arranged around the second discontinuous protrusion structure.

In an embodiment, the contacting part is selectively contacted with the first discontinuous protrusion structure, the second discontinuous protrusion structure or third discontinuous protrusion structure. Consequently, the rotation of the roller element results in a different tactile feel.

In an embodiment, the bottom surface of the concave region is a stepped structure that is inclined downwardly from a periphery of the concave region to the fixing shaft.

In an embodiment, the bottom surface of the concave region is a stepped structure that is inclined downwardly from the fixing shaft to a periphery of the concave region.

In an embodiment, the input device is a mouse.

In an embodiment, the at least one discontinuous protrusion structure includes plural first bulges and plural second bulges. The second bulges are discretely arranged between the first bulges, and the contacting part is contactable with the plural first bulges and the plural second bulges. Consequently, the rotation of the roller element results in an intervallic tactile feel.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
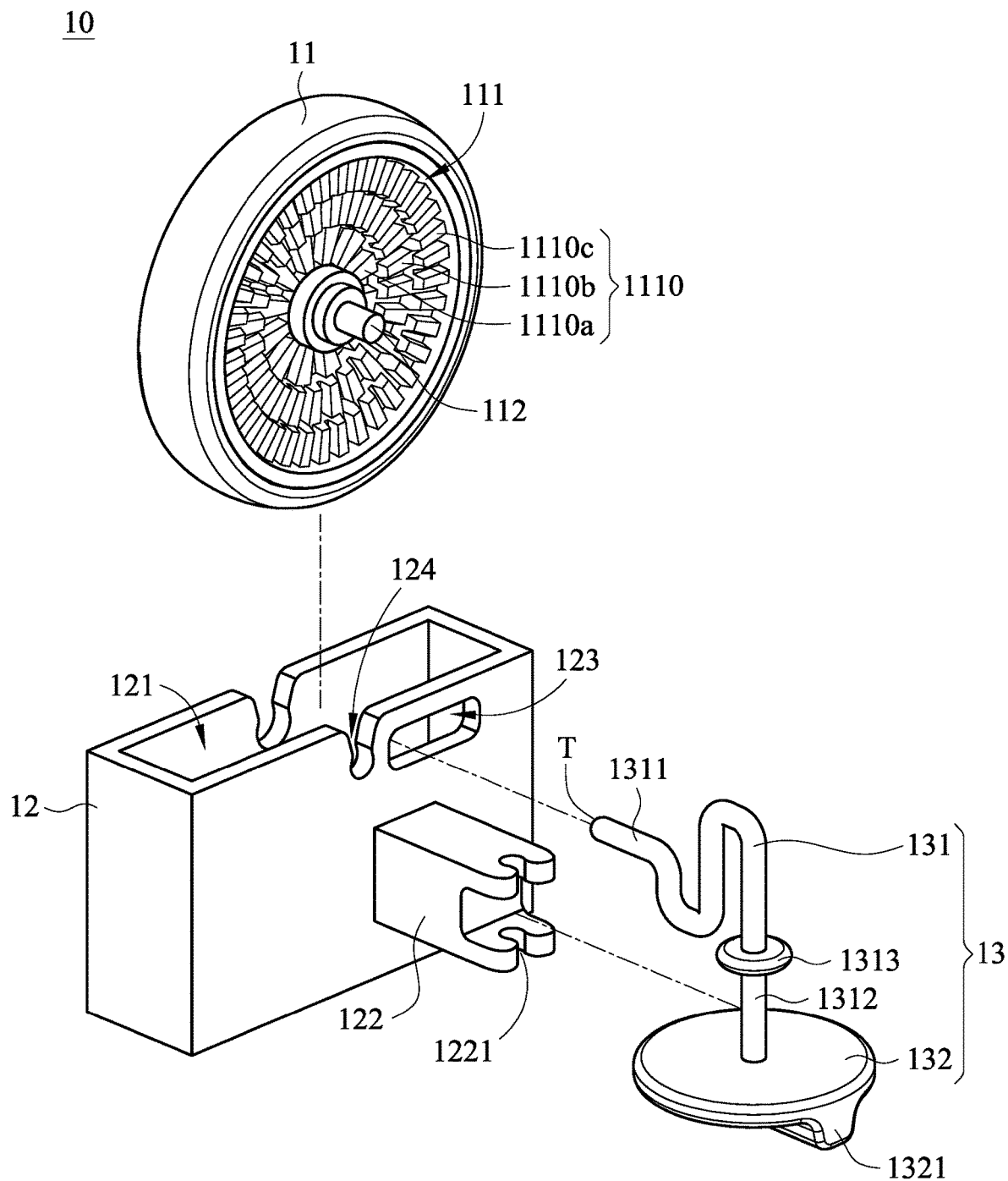
FIG. 1A is a schematic exploded view illustrating a roller module according to an embodiment of the present invention.
Figure 1B:
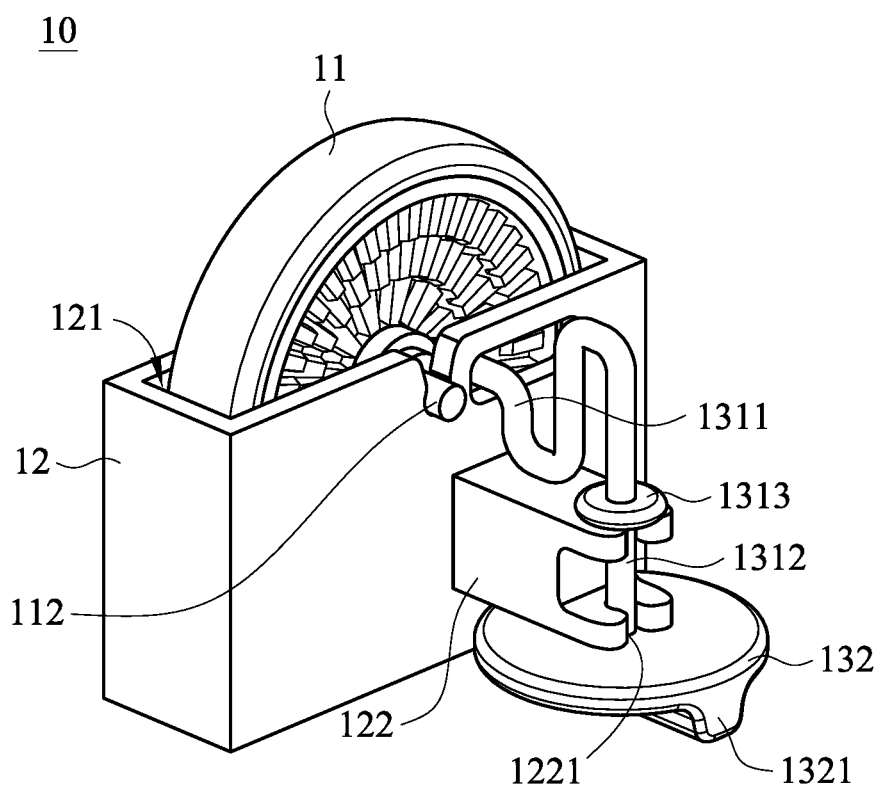
FIG. 1B is a schematic perspective view illustrating the roller module according to the embodiment of the present invention.

Please refer to FIGS. 1A and 1B. FIG. 1A is a schematic exploded view illustrating a roller module according to an embodiment of the present invention. FIG. 1B is a schematic perspective view illustrating the roller module according to the embodiment of the present invention. The roller module 10 comprises a roller element 11, a roller base 12 and an adjusting element 13. The roller element 11 comprises a concave region 111 and a fixing shaft 112. The fixing shaft 112 is partially disposed within the concave region 111. Moreover, plural discontinuous protrusion structures 1110 are disposed on a bottom surface of the concave region 111. In this embodiment, the plural discontinuous protrusion structures 1110 are classified into three types, i.e., first discontinuous protrusion structures 1110a, second discontinuous protrusion structures 1110b and third discontinuous protrusion structures 1110c. The first discontinuous protrusion structures 1110a are circumferentially arranged around the fixing shaft 112. The second discontinuous protrusion structures 1110b are circumferentially arranged around the first discontinuous protrusion structures 1110a. The third discontinuous protrusion structures 1110c are circumferentially arranged around the second discontinuous protrusion structures 1110b. The plural discontinuous protrusion structures 1110 are composed of bulges and adjacent gaps, which are circumferentially arranged on the bottom surface of the concave region 111. The gaps between the bulges of the first discontinuous protrusion structures 1110a, the second discontinuous protrusion structures 1110b and the third discontinuous protrusion structures 1110c are different.

The roller base 12 comprises an accommodation space 121. Two positioning recesses 124 are respectively formed in a first lateral wall and a second lateral wall of the roller base 12 and at a top side of the accommodation space 121. Moreover, a supporting frame 122 is disposed on the first lateral wall of the roller base 12, and a slot 123 runs through the first lateral wall of the roller base 12. The supporting frame 122 has a locking recess 1221.

The adjusting element 13 comprises a contacting part 131 and an operating part 132. The operating part 132 is connected with the contacting part 131. The contacting part 131 comprises a contacting segment 1311, a connecting segment 1312 and a stopping block 1313. The stopping block 1313 is connected between the contacting segment 1311 and the connecting segment 1312. The contacting segment 1311 has a bent structure. Moreover, the contacting segment 1311 is made of a rigid and flexible material such as stainless steel or abrasion-resistance plastic material with high hardness and tenacity (e.g., PC). Moreover, the contacting segment 1311 has a contact terminal T. The connecting segment 1312 is connected with the operating part 132. In an embodiment, the operating part 132 is a knob. Moreover, the operating part 132 has a holding structure 1321 to be operated by the user.

Please refer to FIGS. 1A and 1B again. The roller element 11 is partially accommodated within the accommodation space 121 of the roller base 12. The fixing shaft 112 of the roller element 11 is pivotally coupled to the positioning recesses 124. Consequently, the roller element 11 is rotatable relative to the roller base 12. The connecting segment 1312 of the adjusting element 13 is pivotally coupled to the locking recess 1221 of the supporting frame 122. The stopping block 1313 is contacted with a surface of the supporting frame 122. Consequently, the adjusting element 13 is rotatably locked on the supporting frame 122. The contacting segment 1311 is penetrated through the slot 123 of the roller base 12. In addition, the contact terminal T of the contacting segment 1311 is contacted with the discontinuous protrusion structures 1110.

As the operating part 132 of the adjusting element 13 is operated by the user, the contacting part 131 is correspondingly moved. Consequently, the contacting segment 1311 of the contacting part 131 is swung relative to the stopping block 1313. That is, the stopping block 1313 is served as a fulcrum. As the contacting segment 1311 of the contacting part 131 is swung, the contact terminal T is contacted with the first discontinuous protrusion structures 1110a, the second discontinuous protrusion structures 1110b or the third discontinuous protrusion structures 1110c. Consequently, while the roller element 11 is rotated, different tactile feels are generated.

Figure 2A:
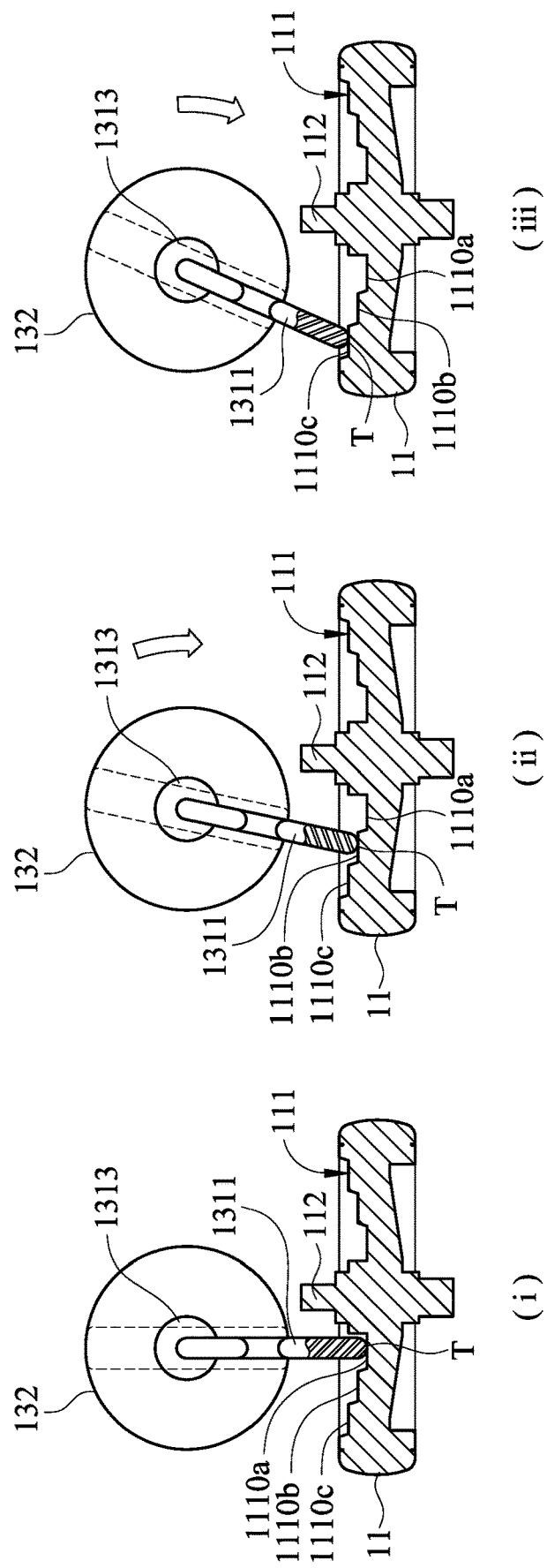
FIG. 2A is a schematic top view illustrating the actions of the adjusting element of the roller module according to the embodiment of the present invention.

FIG. 2A is a schematic top view illustrating the actions of the adjusting element of the roller module according to the embodiment of the present invention. As shown in FIG. 2A, the bottom surface of the concave region 111 is a stepped structure that is inclined downwardly from a periphery of the concave region 111 to the fixing shaft 112. In the situation (i) of FIG. 2A, the contact terminal T of the contacting segment 1311 is contacted with the first discontinuous protrusion structures 1110a. As the roller element 11 is rotated, the contacting segment 1311 is poked by the discontinuous bulges of the first discontinuous protrusion structures 1110a. Consequently, the rotation of the roller element 11 results in a first tactile feel. As the operating part 132 is continuously rotated in the clockwise direction by the user, the contacting segment 1311 is swung relative to the stopping block 1313, and the contact terminal T of the contacting segment 1311 is contacted with the second discontinuous protrusion structures 1110b (e.g., in the situation (ii) of FIG. 2A). Since the gap between the bulges of the second discontinuous protrusion structures 1110b is different from the gap between the bulges of the first discontinuous protrusion structures 1110a, the rotation of the roller element 11 results in a second tactile feel, which is different from the first tactile feel. As the operating part 132 is continuously rotated in the clockwise direction by the user, the contacting segment 1311 is swung relative to the stopping block 1313 and the contact terminal T of the contacting segment 1311 is contacted with the third discontinuous protrusion structures 1110c (e.g., in the situation (iii) of FIG. 2A). Since the gap between the bulges of the third discontinuous protrusion structures 1110c is different from the gap between the bulges of the first discontinuous protrusion structures 1110a and the gap between the bulges of the second discontinuous protrusion structures 1110b, the rotation of the roller element 11 results in a third tactile feel, which is different from the first tactile feel and the second tactile feel.

For example, the gap between the bulges of the first discontinuous protrusion structures 1110a is larger than the gap between the bulges of the second discontinuous protrusion structures 1110b. When the contact terminal T of the contacting segment 1311 is contacted with the first discontinuous protrusion structures 1110a, the rotation of the roller element 11 results in the tactile feel corresponding to the larger gap. When the contact terminal T of the contacting segment 1311 is contacted with the second discontinuous protrusion structures 1110b, the rotation of the roller element 11 results in the tactile feel corresponding to the smaller gap. In the above embodiment, only three kinds of discontinuous protrusion structures 1110 are circumferentially arranged on the bottom surface of the concave region 111. It is noted that the number of the discontinuous protrusion structures 1110, the shapes of the bulges and the gaps between the bulges may be varied according to the practical requirements of the users.

Figure 2B:
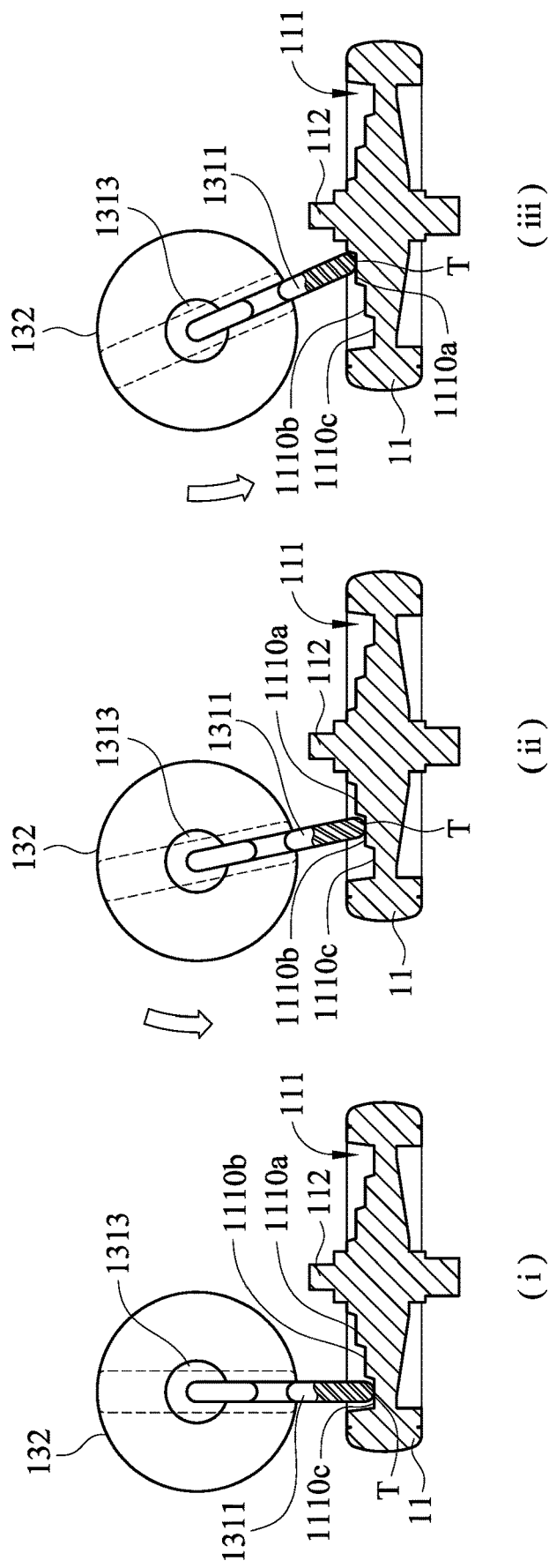
FIG. 2B is a schematic top view illustrating a variant example of the actions of the adjusting element of the roller module according to the embodiment of the present invention.

FIG. 2B is a schematic top view illustrating a variant example of the actions of the adjusting element of the roller module according to the embodiment of the present invention. Component parts and elements corresponding to those of the FIG. 2A are designated by identical numeral references, and detailed descriptions thereof are omitted. In comparison with FIG. 2A, the bottom surface of the concave region 111 is a stepped structure that is inclined downwardly from the fixing shaft 112 to the periphery of the concave region 111. As the operating part 132 is rotated in the counterclockwise direction by the user, the contact terminal T of the contacting segment 1311 is contacted with the third discontinuous protrusion structures 1110c, the second discontinuous protrusion structures 1110b and the first discontinuous protrusion structures 1110a sequentially.

Figure 3A:
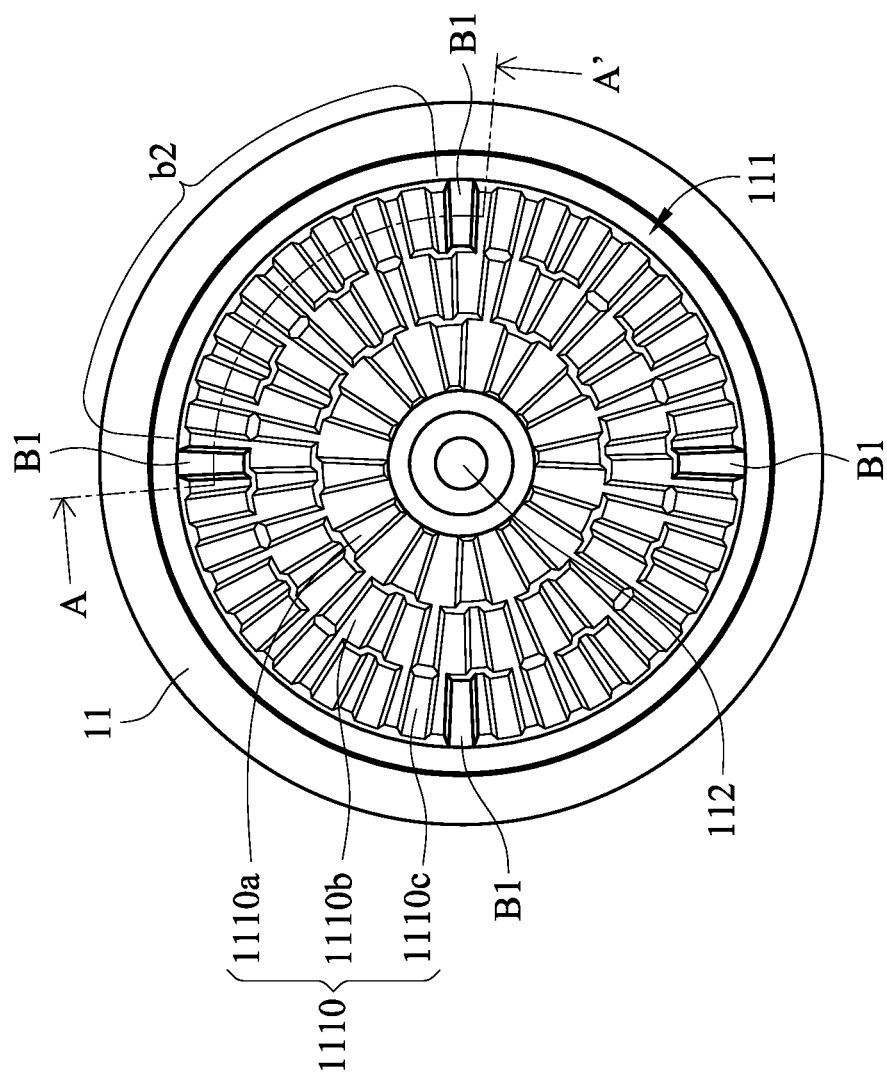
FIG. 3A is a schematic front view illustrating the roller element of the roller module according to the embodiment of the present invention.
Figure 3B:
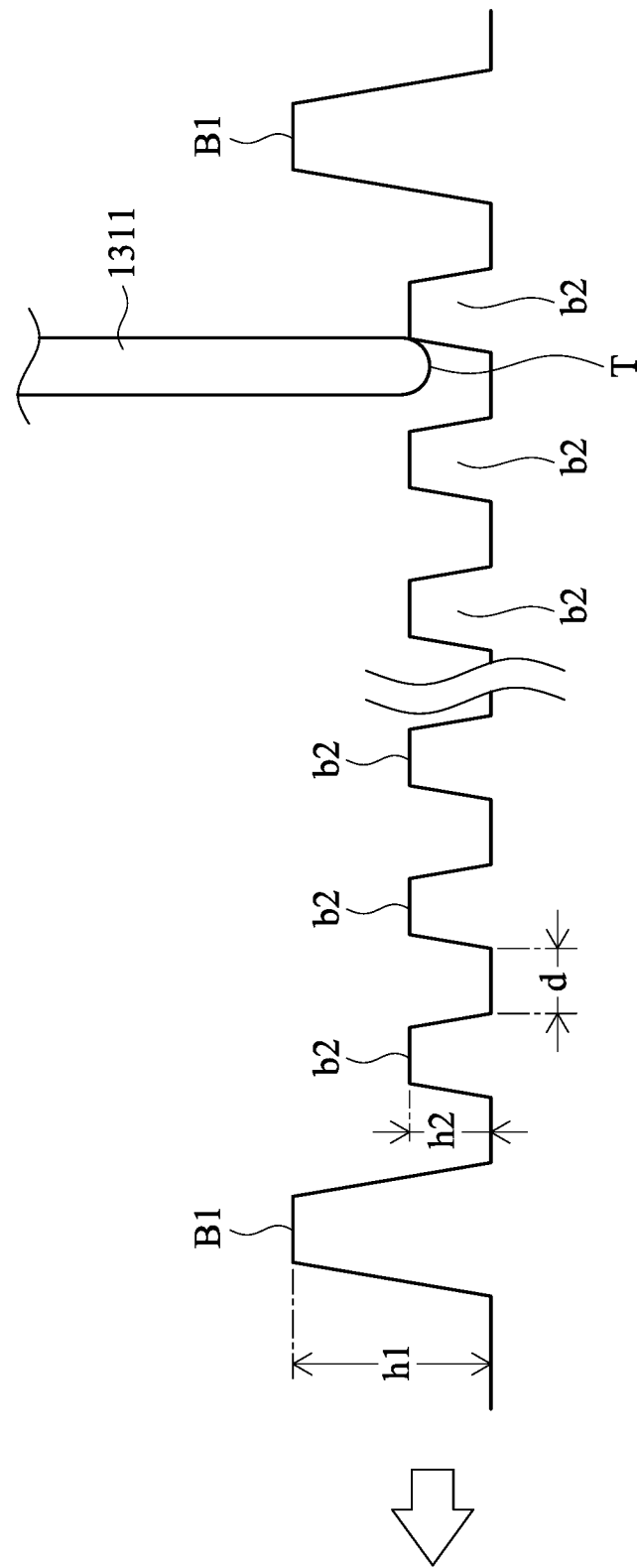
FIG. 3B is schematic cross-sectional view illustrating the roller element of FIG. 3A and taken along the cross section A-A'.

Please refer to FIGS. 3A and 3B. FIG. 3A is a schematic front view illustrating the roller element of the roller module according to the embodiment of the present invention. FIG. 3B is schematic cross-sectional view illustrating the roller element of FIG. 3A and taken along the cross section A-A'. As shown in FIG. 3A, the third discontinuous protrusion structures 1110c in the concave region 111 contain plural first bulges B1 and plural second bulges b2. The second bulges b2 are discretely arranged between two first bulges B1. In this embodiment, four first bulges B1 are located at the third o'clock position, the six o'clock position, the nine o'clock position and the twelve o'clock position. As shown in FIG. 3B. The distance between every two bulges is equal to the gap d. The first bulge B1 has a first height h1. The second bulge b2 has a second height h2. The first height h1 is larger than the second height h2. In this situation, the contact terminal T of the contacting segment 1311 is contacted with the third discontinuous protrusion structures 1110c. Moreover, there is a height difference between the first bulge B1 and the second bulge b2. As the roller element 11 is rotated, the contacting segment 1311 is poked by the first bulges B1 and the second bulges b2. Consequently, the rotation of the roller element 11 results in the intervallic tactile feel. Due to the intervallic tactile feel, the user can sense the rotation angle of the roller element 11.

In the above embodiment, there is a height difference between the first bulge B1 and the second bulge b2 of the third discontinuous protrusion structures 1110c. It is noted that the number of the bulges and the positions of the bulges may be determined according to the practical requirements of the user. That is, the number of the bulges and the positions of the bulges may be adjusted during the process of fabricating the roller element.

Figure 4A:
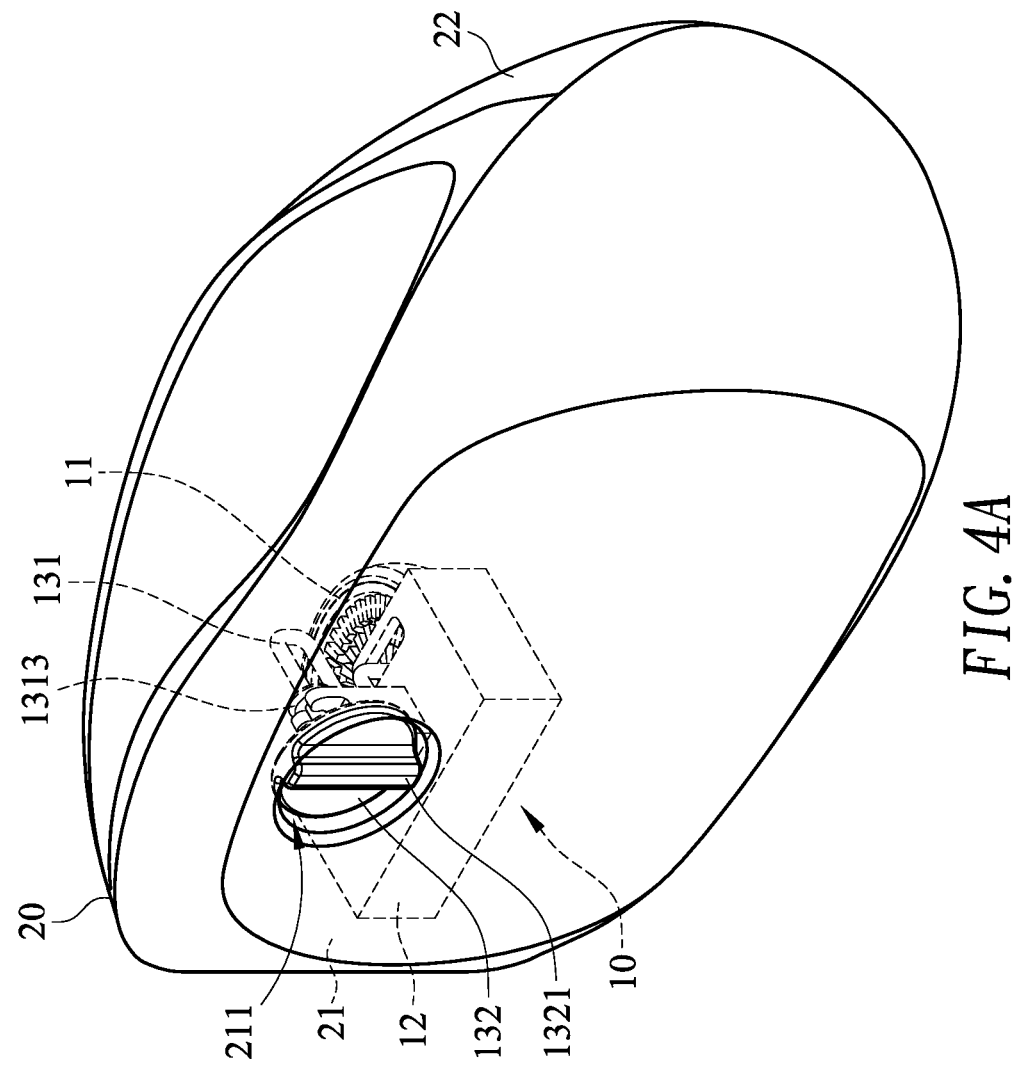
FIG. 4A is a schematic perspective view illustrating a mouse with the roller module of the present invention.
Figure 4B:
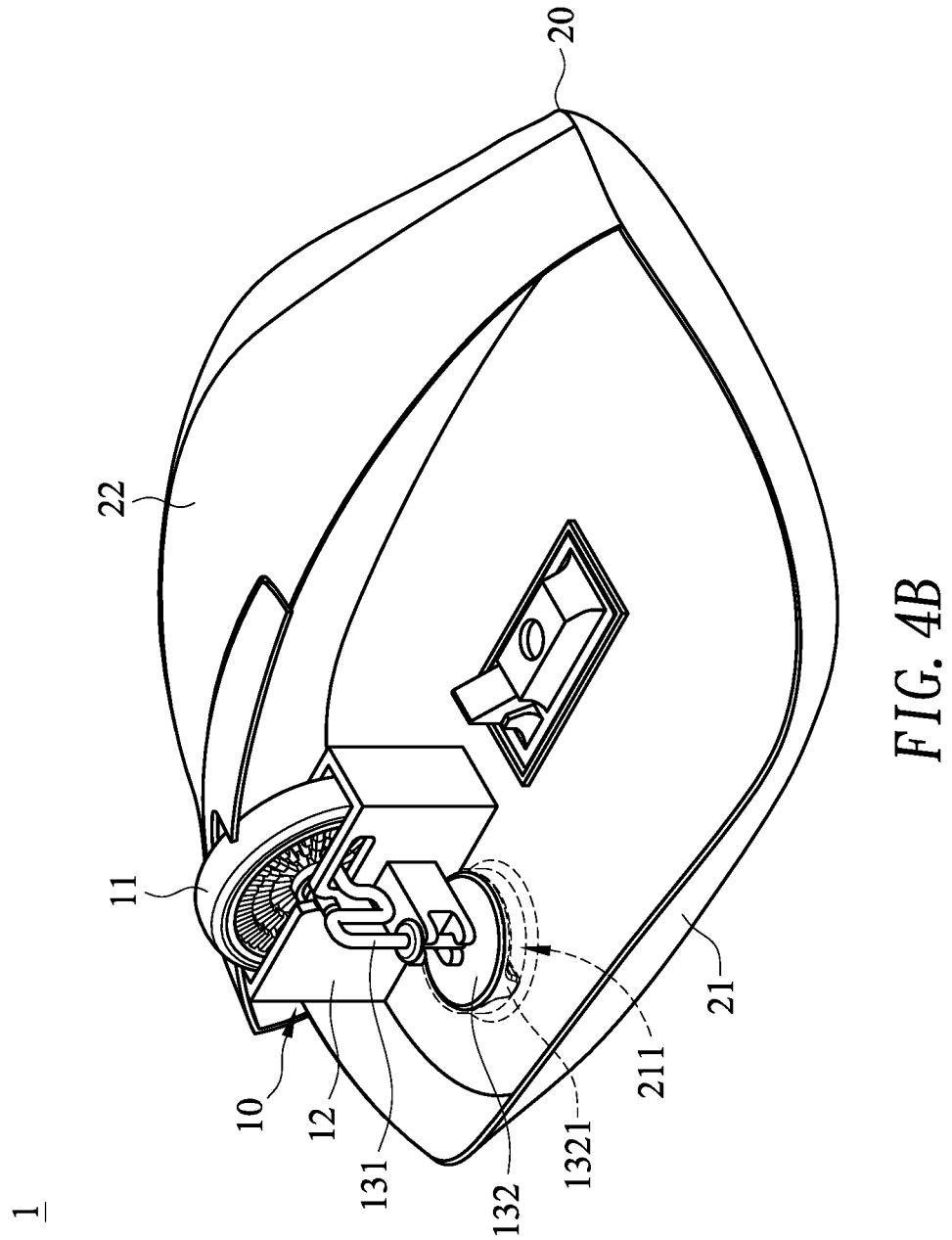
FIG. 4B is a schematic perspective view illustrating the inner structure of the mouse as shown in FIG. 4A.

Please refer to FIGS. 4A and 4B. FIG. 4A is a schematic perspective view illustrating a mouse with the roller module of the present invention. FIG. 4B is a schematic perspective view illustrating the inner structure of the mouse as shown in FIG. 4A. The mouse 1 comprises a casing 20. The casing 20 is a combination of a lower cover 21 and an upper cover 22. The lower cover 21 has an adjusting hole 211. The roller module 10 is fixed on the lower cover 21 through the roller base 12. The operating part 132 of the adjusting element 13 is installed in the adjusting hole 211 of the lower cover 21. As the holding structure 1321 of the operating part 132 is clamped and rotated by the user's fingers, the tactile feel in response to the rotation of the roller element 11 is correspondingly adjusted. The upper cover 22 has an opening (not shown). The roller element 11 is installed in the opening and partially exposed outside the outer surface of the upper cover 22. Consequently, the user may operate the roller element 11 with a finger to generate the corresponding roller signal. In the above embodiment, the adjusting element 13 is pivotally coupled to the roller base 12. In some other embodiments, the adjusting element 13 is directly installed on the casing 20, and the adjusting element 13 is not contacted with the roller base 12 of the roller module 10.

As mentioned above, the structure of the conventional roller is complicated. The structure of the roller module of the present invention is simplified. The discontinuous protrusion structures disposed on the bottom surface of the concave region of the roller element provide two or more than two different tactile feels. Consequently, the operations of the roller element can meet the diversified requirements of the users. In other words, the roller module of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A roller module for an input device, the roller module comprising: a roller base; a roller element comprising a concave region and a fixing shaft, wherein the fixing shaft is partially disposed within the concave region and pivotally coupled to the roller base, and at least one discontinuous protrusion structure is circumferentially arranged at a bottom surface of the concave region; and an adjusting element comprising a contacting part and an operating part, wherein the operating part is connected with the contacting part, wherein the contacting part is contacted with the at least one discontinuous protrusion structure, so that a rotation of the roller element results in a tactile feel, wherein the at least one discontinuous protrusion structure includes a first discontinuous protrusion structure, a second discontinuous protrusion structure and a third discontinuous protrusion structure, wherein the first discontinuous protrusion structure is circumferentially arranged around the fixing shaft, the second discontinuous protrusion structure is circumferentially arranged around the first discontinuous protrusion structure, and the third discontinuous protrusion structure is circumferentially arranged around the second discontinuous protrusion structure.

2. The roller module according to claim 1, wherein the roller base comprises an accommodation space, and the roller element is partially accommodated within the accommodation space.

3. The roller module according to claim 1, wherein two positioning recesses are respectively formed in a first lateral wall and a second lateral wall of the roller base and at a top side of the accommodation space, and the fixing shaft is pivotally coupled to the positioning recesses.

4. The roller module according to claim 1, wherein a supporting frame is disposed on first lateral wall of the roller base, and the supporting frame has a locking recess.

5. The roller module according to claim 4, wherein the contacting part comprises:
- a contacting segment having a contact terminal, wherein the contact terminal is contacted with the at least one discontinuous protrusion structure;
- a connecting segment pivotally coupled to the locking recess and connected with the operating part; and
- a stopping block connected between the contacting segment and the connecting segment, and the stopping block is contacted with a surface of the supporting frame, wherein the contacting segment is permitted to be swung relative to the stopping block.

6. The roller module according to claim 5, wherein the roller base has a slot, and the contacting segment is penetrated through the slot.

7. The roller module according to claim 1, wherein the operating part is a knob with a holding structure.

8. The roller module according to claim 1, wherein the contacting part is selectively contacted with the first discontinuous protrusion structure, the second discontinuous protrusion structure or third discontinuous protrusion structure, so that the rotation of the roller element results in a different tactile feel.

9. The roller module according to claim 1, wherein the bottom surface of the concave region is a stepped structure that is inclined downwardly from a periphery of the concave region to the fixing shaft.

10. The roller module according to claim 1, wherein the bottom surface of the concave region is a stepped structure that is inclined downwardly from the fixing shaft to a periphery of the concave region.

11. The roller module according to claim 1, wherein the input device is a mouse.

12. The roller module according to claim 1, wherein the at least one discontinuous protrusion structure comprises plural first bulges and plural second bulges, wherein the second bulges are discretely arranged between the first bulges, and the contacting part is contactable with the plural first bulges and the plural second bulges, so that the rotation of the roller element results in an intervallic tactile feel.

* * * * *